APPARATUS FOR MAINTAINING A PREDETERMINED AIR GAP BETWEEN A TRANSDUCER HEAD AND A RECORD MEDIUM IN A MAGNETIC DATA STORAGE DEVICE

Filed Nov. 13, 1958 7 Sheets-Sheet 1

Inventors
Forrest A. Johnson & Herbert E. Miller
by Sughrue and Rothwell
Attys

Inventors
Forrest A. Johnson
Herbert E. Miller
by Sughrue and Rothwell Attys

Oct. 2, 1962 F. A. JOHNSON ETAL 3,056,962

APPARATUS FOR MAINTAINING A PREDETERMINED AIR GAP BETWEEN A TRANSDUCER HEAD AND A RECORD MEDIUM IN A MAGNETIC DATA STORAGE DEVICE

Filed Nov. 13, 1958 7 Sheets-Sheet 3

Inventors
Forrest A. Johnson
Herbert E. Miller by Sughrue and Rothwell Attys

Oct. 2, 1962 F. A. JOHNSON ETAL 3,056,962

APPARATUS FOR MAINTAINING A PREDETERMINED AIR GAP BETWEEN A TRANSDUCER HEAD AND A RECORD MEDIUM IN A MAGNETIC DATA STORAGE DEVICE

Filed Nov. 13, 1958 7 Sheets-Sheet 4

Inventors
Forrest A. Johnson
Herbert E. Miller by Sughrue and Rothwell Attys

APPARATUS FOR MAINTAINING A PREDETERMINED AIR GAP BETWEEN A TRANSDUCER HEAD AND A RECORD MEDIUM IN A MAGNETIC DATA STORAGE DEVICE

Filed Nov. 13, 1958 7 Sheets-Sheet 5

Inventors
Forrest A. Johnson
Herbert E. Miller by Sughrue and Rothwell Attys

APPARATUS FOR MAINTAINING A PREDETERMINED AIR GAP BETWEEN A TRANSDUCER HEAD AND A RECORD MEDIUM IN A MAGNETIC DATA STORAGE DEVICE

Filed Nov. 13, 1958 7 Sheets-Sheet 6

Inventors
Forrest A. Johnson
Herbert E. Miller
by Sughrue and Rothwell Attys

APPARATUS FOR MAINTAINING A PREDETERMINED AIR GAP
BETWEEN A TRANSDUCER HEAD AND A RECORD MEDIUM
IN A MAGNETIC DATA STORAGE DEVICE

Filed Nov. 13, 1958 7 Sheets-Sheet 7

Inventors
Forrest A. Johnson
Herbert E. Miller
by Sughrue and Rothwell Attys 3,056,962

APPARATUS FOR MAINTAINING A PREDETERMINED AIR GAP BETWEEN A TRANSDUCER HEAD AND A RECORD MEDIUM IN A MAGNETIC DATA STORAGE DEVICE

Forrest A. Johnson, Springfield, Vt., and Herbert E. Miller, West Acton, Mass., assignors, by mesne assignments, to Ex-Cell-O Corporation, Detroit, Mich., a corporation of Michigan Filed Nov. 13, 1958, Ser. No. 773,586
3 Claims. (Cl. 346—74)

This invention relates to magnetic data storage devices in general, and in particular to a method and apparatus for automatically maintaining a constant predetermined air gap between a relatively fixed transducer head and a moving record medium.

Magnetic data storage devices, as are well known in the art, consist basically of a rotatable or generally movable record body provided with a magnetizable surface layer and one or more transducer heads positioned adjacent thereto. The transducer heads have magnetic flux-defining pole pieces and these heads are fixed relative to the moving record medium with the pole pieces facing the magnetizable surface layer and spaced therefrom to form a predetermined air gap therebetween. This air gap between the transducer heads and the magnetizable surface layer of the record body is normally only a few thousandths of an inch, and some of the magnetic record devices need an air gap of less than a thousandth of an inch. To initially establish such minute air gap spacing in static conditions requires comparatively slight difficulties using presently known techniques, but maintaining this spacing during dynamic conditions poses considerable problems. Thermal expansion, eccentricity, wobble, and runout of the component parts in the apparatus all contribute to upset the statically established air gap, and the magnitude of such error-causing factors becomes greater as the device becomes larger, while the object is still to retain the fundamentally desirable minute air gap spacing.

It is therefore the primary object of this invention to provide a method and apparatus for automatically and spontaneously maintaining an initially established air gap during operation of a magnetic data storage device.

A further object of this invention is to provide a magnetic data storage device having an inherent "fail-safe" characteristic, i.e., in the case of power failure or the like the transducer heads are prevented from making physical contact with the magnetizable record surface.

An additional object of this invention is to provide a magnetic data storage device structure that is simple to manufacture from elements that cooperate with a minimum of friction and are not susceptible to wear and deterioration affecting their function during a reasonable period of time.

Other objects and advantages of this invention will be apparent from the following detailed description taken in connection with the accompanying drawings illustrating a preferred embodiment as well as several variations exemplifying diverse ways of utilizing the invention.

Briefly, the present invention includes a magnetic data storage device having a carrier element which mounts transducer heads in proper relation to a movable record storage medium. The carrier element and the heads carried thereby are movable perpendicularly toward and away from the surface of the record medium and hydrostatic bearing means, acting between the carrier and the surface of the record medium, are provided to constantly maintain a predetermined relationship therebetween. A fluid motor is adapted to move the carrier element toward the surface of the record medium, while overcoming a constantly present force biasing the carrier element in the opposite direction. The hydrostatic bearing means are proportioned, such that, at a predetermined position of the carrier, equilibrium will be achieved between the forces of the biasing means, fluid motor, and the reactive forces of the hydrostatic bearing means. A single fluid supply source is provided for the fluid motor and the hydrostatic bearing means.

Figures 1, 2:
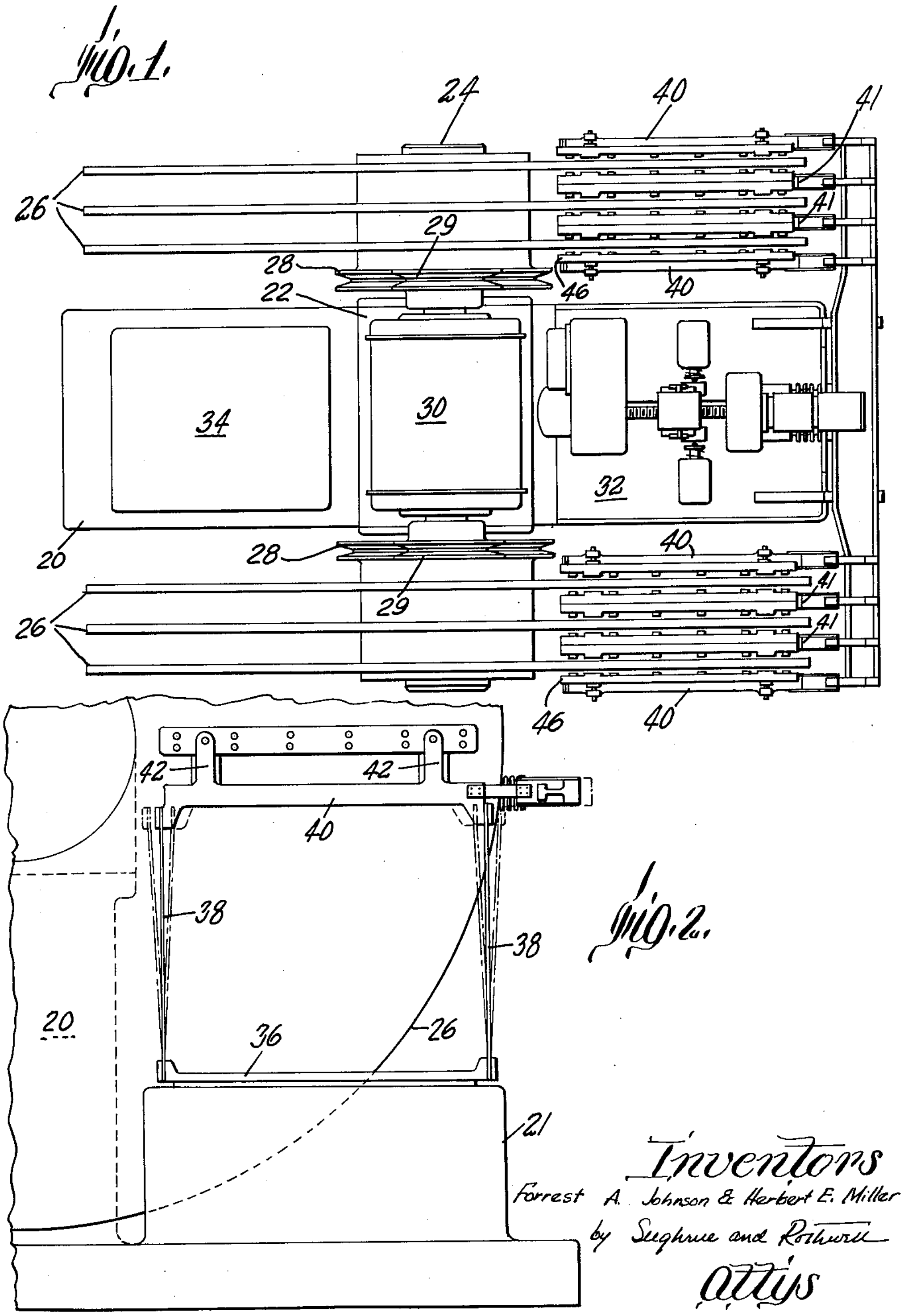
FIG. 1 is a plan view of a magnetic data storage device utilizing the air gap spacing method and apparatus of this invention.
FIG. 2 is an elevation view of the portion of the magnetic data storage device of FIG. 1 which includes the air gap spacing arrangement.

Referring to the drawings, in FIG. 1 there is shown a magnetic data storage device of the rotatable disc type to which the present invention is applied in a preferred embodiment. FIG. 2 is an elevation of a portion of the magnetic data storage device shown in FIG. 1, which portion includes the air gap spacing arrangement of the present invention. The rotatable disc magnetic data storage device is supported by a bed 20. Extending upwardly from the bed 20 are a plurality of support ribs 21, and a bearing housing 22 is secured to the base 20. Suitably journaled within bearing housing 22 is a rotatable shaft 24 which carries a plurality of discs 26 rigidly secured thereto by keys or the like. Each disc 26 has a magnetizable surface layer 27, FIG. 7, on each side thereof for receiving the magnetic data to be stored thereon. The shaft 24 and discs 26 carried thereby are driven by means of V-belts, not shown, which are trained around driven pulleys 28, on shaft 24, and drive pulleys 29 which are rigidly connected to the shaft of a drive motor 30 which in turn is mounted on bearing housing 22.

Also supported by the bed 20 are a positioner mechanism assembly 32 and a cabinet 34 for the controls of the device. Since these elements form no integral part of the present invention they will not be described in detail herein. The positioner mechanism assembly 32 is described in detail in our copending application Serial No. 773,585, filed November 13, 1958, and which has matured as Patent No. 3,009,759.

Figures 3, 4:
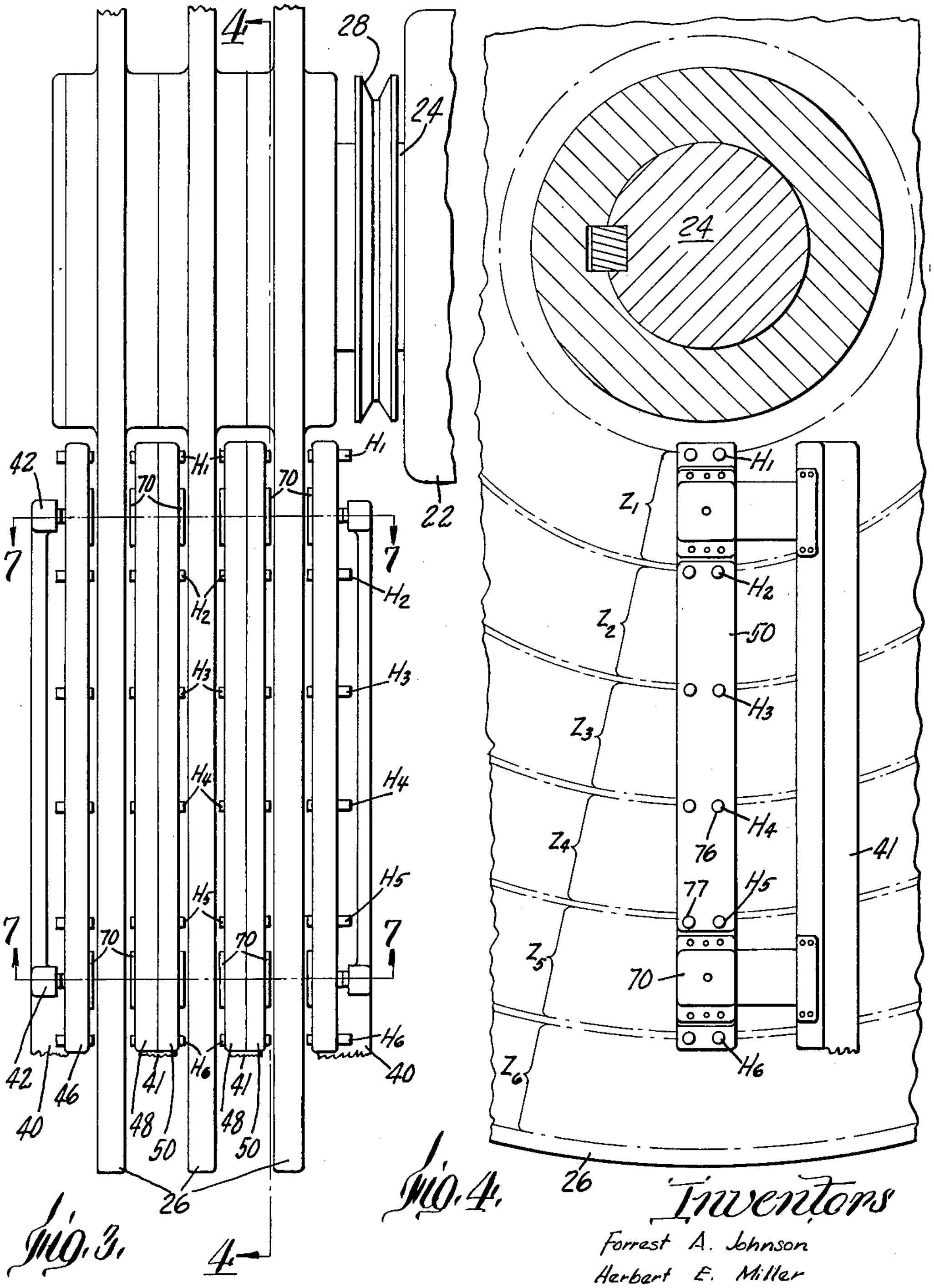
FIG. 3 is an enlarged plan view of a portion of the magnetic data storage device shown in FIG. 2.
FIG. 4 is a sectional view taken along line 4—4 of FIG. 3.

A plurality of magnetic transducer heads $H_1$, $H_2$, $H_3$, $H_4$, $H_5$, and $H_6$ are provided adjacent each magnetizable surface layer 27 of each rotary disc 26, FIGS. 3 and 4. These transducer heads are equally spaced radially from the center of the disc 26 and are movable together relative to the bed 20 in a radial direction to cover a limited distance or zone indicated in FIG. 4 by symbols $Z_1$, $Z_2$, $Z_3$, $Z_4$, $Z_5$, and $Z_6$. This radial movement may be continuous or in discrete steps actuated by an apparatus such as positioner mechanism assembly 32 which forms no part of the present invention. Other arrangements for positioning the transducer heads relative to the magnetizable surface layers may be used, e.g., where an arcuate sweeping movement of the heads is utilized.

The present invention relates to the method and apparatus for accomplishing the air gap spacing for the transducer heads and maintaining this air gap at a predetermined dimension. In general, the structure shown in FIGS. 3 and 4 includes outboard transducer head carriers 46 for the outwardly facing disc surfaces and inboard head carriers 48 supporting the transducer heads in the space between adjacent discs. The inboard carriers 48 include a plurality of magnetic transducer heads $H_1$, $H_2$ . . . $H_6$ in opposite directions, while the outboard carriers 46 also contain transducer heads $H_1$, $H_2$ . . . $H_6$ facing inwardly only. The outboard carriers 46 are hinged to a frame 40 and the inboard carriers 48 and 50 are hingedly supported by a mutual inboard frame 41, the details of which will be described subsequently.

Figure 7:
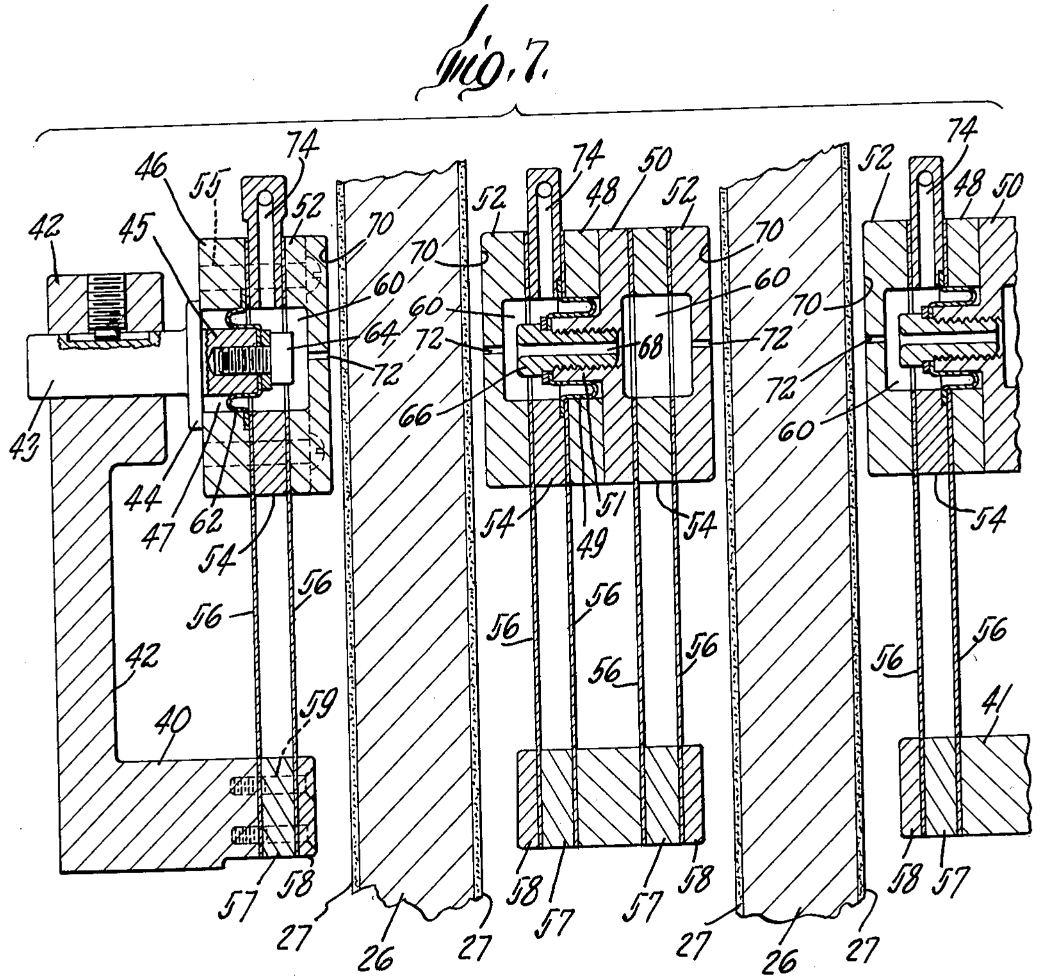
FIG. 7 is a sectional view taken along line 7—7 of FIG. 3.

A bracket 36, FIG. 2, is secured to the top surface of the support ribs 21. A pair of parallel reeds 38, 38 are attached at their lower ends to the ends of bracket 36 and at their upper ends to the ends of the corresponding frames 40 and 41. Lugs 42 spaced towards the ends of, and integral with frames 40 include a bore for receiving a supporting stud 43, FIG. 7. The supporting stud 43 includes an enlarged portion 44 and a piston portion 45. The enlarged portion 44 of stud 43 abuts against the outside of an outboard carrier 46 and the piston portion 45 of stud 43 extends within a cylindrical bore 47 of outboard carrier 46. In a somewhat similar manner inboard carrier 48, FIG. 7, is provided with a cylindrical bore 49 and adjacent inboard carrier 50 includes a piston portion 51 extending within cylindrical bore 49. A cover member 52 is provided to close the end of the carriers 46, 48, and 50 adjacent the magnetizable surface layer 27 of disc 26, FIG. 7.

A spacer member 54 spaces cover 52 from the carrier 46 and suitable screws 55 are provided for securing the cover spacer and carrier in rigid relationship, FIG. 7. A pair of parallel reeds 56 are clamped in the assembly on each side of the spacer 54 and the lower end of reeds 56 as viewed in FIG. 7 are secured to outboard frame 40 in a similar manner, i.e., a spacer block 57 the same width as spacer 54 is positioned between the parallel reeds 56 and a clamp plate 58 is provided with suitable screws 59 for securing the assembly in rigid relationship.

A cavity 60 in cover plates 52, spaces 54, and reeds 56 is provided for each of the assemblies shown in FIG. 7. A diaphragm 62, which is an adaptation of a commercial product known as "Belloframe," is rigidly secured between the carriers 46 and 48 and the corresponding piston portions 45 and 51 to close off one end of the cylindrical cavity 60. This so formed chamber constitutes a movable cylinder portion of a fluid motor. The diaphragm 62 is secured to the piston 45 by means of a screw 64 threaded in a bore in the piston. In a somewhat similar manner the diaphragm of carrier 48 is secured to piston 51 by a screw 66 having an axial bore 68 forming a connecting passage between chambers 60—60 of carriers 48 and 50. An outer surface or pad 70 of the cover member 52 facing the adjacent surfaces 27 function as one of the structural elements of a hydrostatic bearing in a manner which will presently be described.

Cover members 52 are each provided with a restricted passage or orifice 72 in the center of the pad 70 connecting the chambers 60 with the ambient adjacent the magnetizable surface layers 27. Fluid under pressure is admitted through conduit 73, FIG. 6, into conduit 74, FIG. 7, and it then enters the bore 60 from which a predetermined amount may escape through orifice 72. A connecting line 75 is provided for connecting the various fluid conduit 74 for each fluid motor of each carrier.

Figure 6:
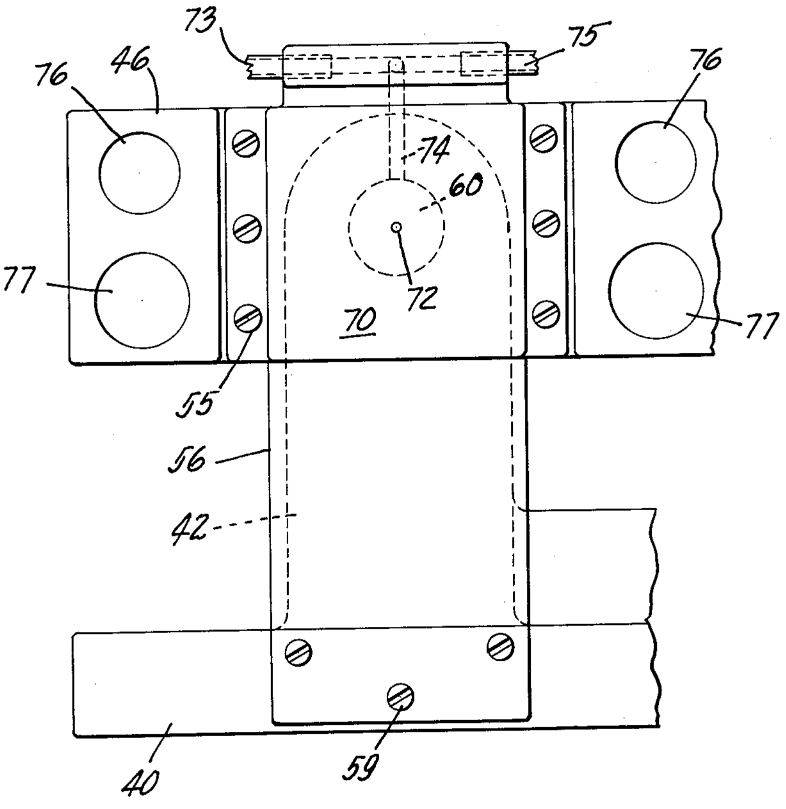
FIG. 6 is an elevation view of the portion of the apparatus illustrated in FIG. 5.

As shown in FIGS. 4 and 6, the carriers are provided with bores 76 for affixing the transducer heads $H_1$ to $H_6$ by suitable means, not shown. Bores 77 are clearance bores for the heads mounted in an adjacent carrier and extending rearwardly, see FIG. 12.

Figure 5:
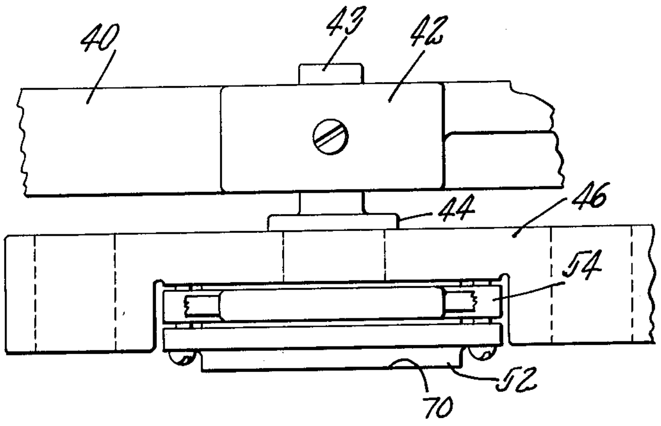
FIG. 5 is an enlarged detail plan view of a portion of FIG. 3 showing a portion of the magnetic head carrier and one of the spacing pad assemblies therein.

The carriers 46, 48 and 50 are provided with identical structures such as described in connection with FIGS. 5, 6, and 7 in each end thereof as shown in FIG. 3. Therefore, it is apparent that the carriers may be imparted a limited movement either through displacing both ends in unison or permitting one end to lead or lag the other in movement toward and away from the surface of the record medium.

Referring to FIG. 7, the carriers 48 and 50 between adjacent discs and the hydrostatic bearings carried thereby are supported and constructed in a similar manner and for the same purpose and function as described with regard to outboard carrier 46. However, the carriers 48 and 50 have a slight structural variation predicated by a cooperative organization of the two carriers. Whereas, with regard to carrier 46, the cover pad 52 is movable with respect to the stationary piston 45, the carriers 48 and 50 both are movable relative to one another, thus carrier 50 carries the piston portion and carrier 48 carries the cylinder portion of the fluid motor, and both portions are movable relative to one another. Passage 68 is of sufficient diameter such that it will not impede the free movement of fluid between the cooperating chambers 60.

The carriers 46, 48, and 50 are mounted as shown in FIG. 3 with the surfaces 70 being elements of hydrostatic bearings facing a radial surface of an adjacent disc 26 in parallel relationship thereto. The suspension of the carriers as provided by reeds 56 is initially biased by a spring factor to normally urge the displacement of the surfaces 70 away from the magnetizable surface layers 27 of disc 26. This position is defined, FIG. 7, for carrier 46 when it abuts flange 45 of stud 43 and for carriers 48 and 50 when their adjacent surfaces contact each other.

*Operation*

When the device is not operating the carriers 46, 48, and 50 occupy the position illustrated in FIG. 7 due to bias of the reeds 56 urging the carriers to their retracted position away from the magnetizable surface layers 27. When a fluid pressure medium is admitted through supply lines 73 into the chambers 60 of the fluid motors at each end of each of the carriers, the force thereof will act against the bias of the reeds 56 and thereby move the carriers toward the surfaces of their corresponding disc. This movement caused by the fluid pressure is further opposed by the force of the fluid which flows through orifices 72 to form a resistive leakage path between the surfaces 70 and the adjacent magnetizable surface layers 27. These elements, orifices 72, pads 70 and surface layers 27, constitute the elements of a hydrostatic bearing structure. The factors which quantitatively govern the forces acting on the carriers are the forces of the reeds, the fluid motor, and size of the leakage path of the hydrostatic bearing and these elements are proportioned in such a manner that equilibrium is established between the combination of these forces when the carrier is displaced to a position where the separation between the surface 70 and surface layer 27 is a predetermined value. More specifically, as each carrier is moved by the pressure of the fluid motors, the opposing spring force of the reeds 56 increases and when the pad surfaces 70 reach a predetermined distance (normally about .002 inch) from the disc surface 27 an added opposing force starts to build up from the hydrostatic bearing. When the sum of the opposing forces equal the force of the fluid motors, equilibrium is achieved and the carrier will move no further toward the surface layer.

In magnetic data storage devices the desired spacing between the tip of the transducer head and the magnetizable surface layer may be very small, amounting to only a few thousandths of an inch or even fractions of a thousandth of an inch. In the best presently known rotative apparatus, it is impossible to consistently achieve a dead true running rotative element. Added to this condition are such other disturbing factors such as dynamic and thermal factors which influence moving machine elements and disturb the achieved static precision of the device. In a rotatable disc-type device as discussed herein, it is practically impossible to fully eliminate wobble, i.e., the tendency of the disc to oscillate away from a radial plane through its rotative axis. This problem becomes proportionately greater with larger discs and the prerequisite of small air gap spacing stays the same irrespective of disc size. The problems as stated above are compensated by the present invention in the following manner: When runout or wobble occurs, changes will develop in the leakage path of the hydrostatic bearing which give rise to a force which is required to move the carrier in the direction of the runout. Additional leakage path variation occurs simultaneously to compensate for changes in the spring force of the reeds resulting from the change in their deflection effected when the carrier changes position attempting to follow a runout or wobble of its adjacent disc. The leakage path variation then constitutes an error responsive means acting to restore the condition of equilibrium and in this respect it is sensitively responsive to minute changes in the leakage path and, hence, the carriers will follow the runout or wobble.

From the foregoing description of the operation, it will be evident that with the presence of pressurized fluid in the expandable chambers 60 of the carriers 46, 48, and 50, the predetermined spacing of the carrier from the adjacent disc is under constant control, not only when the disc surfaces are running in a true radial plane but also during wobble condition when the disc surfaces oscillate. This is because the dual fluid power supply to the fluid motor and bearing, and the suspension means of the carrier, in cooperation and under interaction, compel the carrier to be positioned a predetermined distance from the disc surface in a single plane defined by the pad surfaces 70, and this single plane is always in parallel relationship to the disc surface, irrespective of any disc wobble.

The combination of the fluid motor, hydrostatic bearing, and spring reeds in mutual coacting relationship endows the structural arrangement of the present invention with the desirable feature of being "fail-safe." It is well known that in magnetic data storage devices it is destructive to the device if the magnetic transducer heads make physical contact with a magnetizable surface layer for any period of time. The friction developed between a head contacting an accurately machined magnetizable surface layer would destroy the usefulness of the device. In the arrangement described above, in the event of the failure of fluid pressure that establishes the proper air gap, the carriers for the transducer heads are automatically retracted under the bias of the reed suspension.

Figure 8:
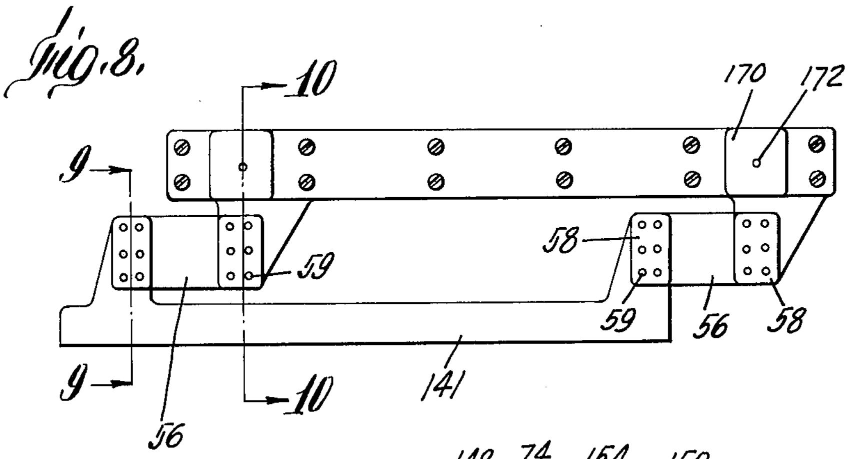
FIG. 8 is a modification of the transducer head suspension means illustrated in FIG. 4.
Figures 9, 10:
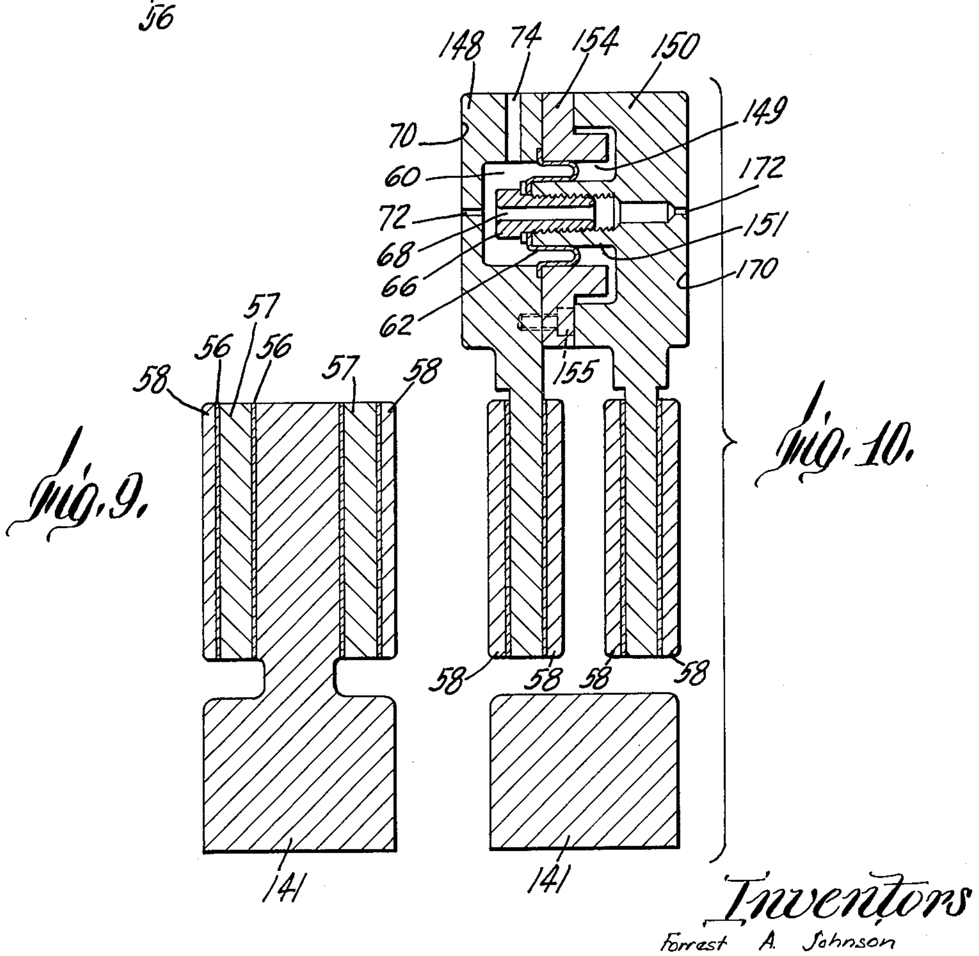
FIG. 9 is a sectional view taken along line 9—9 of FIG. 8.
FIG. 10 is a sectional view taken along line 10—10 of FIG. 8.

A modification of the suspension means of the carriers is shown in FIGS. 8, 9, and 10. The reference numerals which are the same as the numerals in FIGS. 1–7, inclusive, indicate the same components having the same functions. In this modification, the frame 141 is secured to the biasing and supporting reeds 56 by clamp plates 58 and suitable screws 59. Spacers 57 are provided between each pair of biasing reeds 56. Referring to FIG. 10, inboard carrier 148 and inboard carrier 150 cooperate in a manner similar to that described in connection with FIG. 7. Inboard carrier 150 includes a piston portion 151. A cover plate 154 is secured to the carrier 148 by suitable screws 155 and this cover has a cylindrical bore 149 therein. The reeds 56 are arranged to normally bias the carriers 148 and 150 toward each other in abutting relationship as shown in FIG. 10, and in operation the device functions similar to that described above in connection with FIGS. 1–7.

Figure 12:
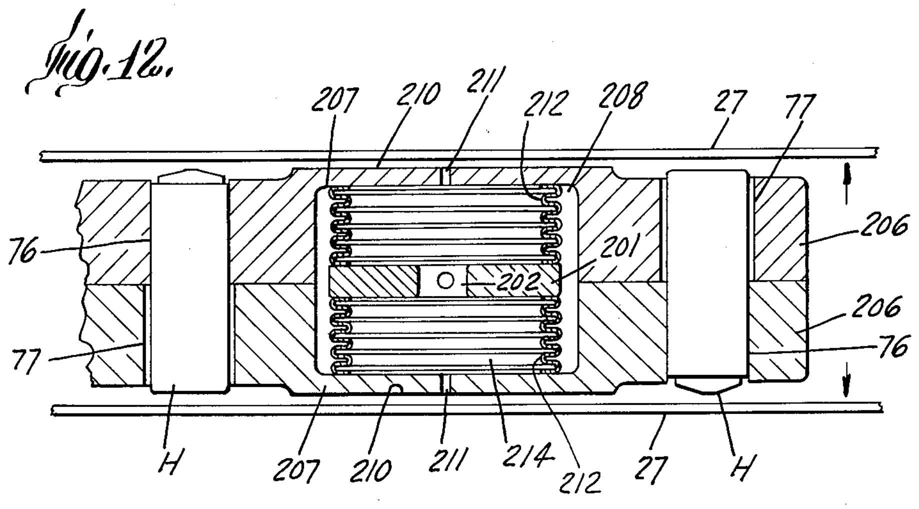
FIG. 12 is a sectional view taken along line 12—12 of FIG. 11.
Figure 11:
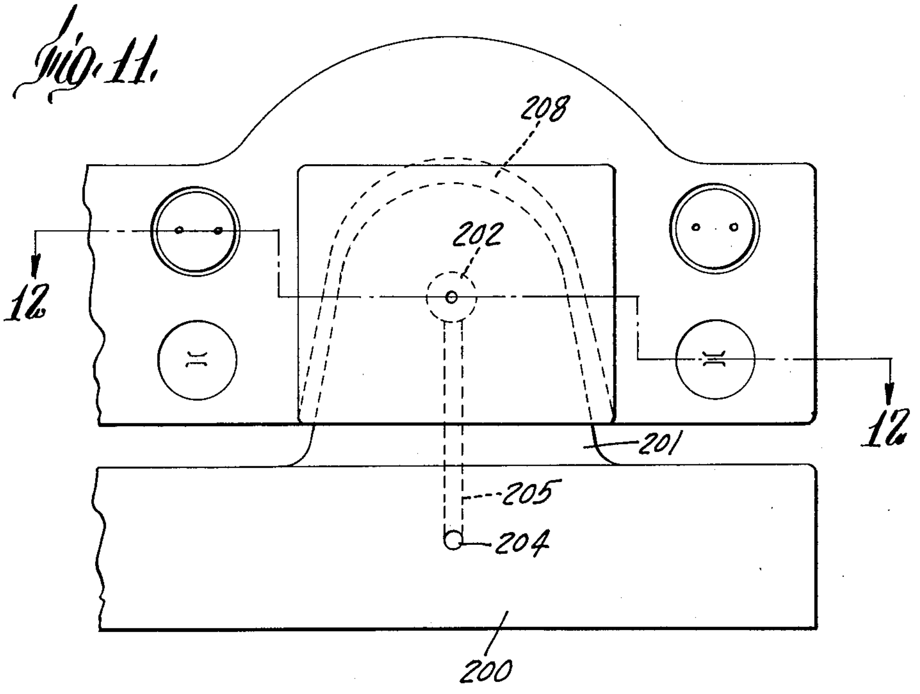
FIG. 11 is an elevation view showing another modification of the suspension means and air gap spacing apparatus.

A further modification of the fluid motor and spring suspension arrangement is shown in FIGS. 11 and 12. In this modification a frame 200 contains an upstanding lug 201 having a bore 202 therein. A fluid pressure medium may be admitted through the fluid pressure line 204 and through a conduit 205 into bore 202. A pair of carriers 206 are provided for carrying the magnetic transducer heads H. The carriers are recessed in the support area and this recess includes a wall portion 207 and a downwardly opening cavity 208 to receive lug 201. Each of the carriers 206 is provided with an outwardly facing pad or bearing surface 210 having a restricted opening or orifice 211 near the center thereof. A pair of suitable bellows 212 are hermetically sealed to lug 201 and the walls 207 to provide a fluid chamber or cavity 214. The interior of the bellows assembly in the cavity formed by lug 201, wall 207, and bellows 212 forms the expansible chamber of a fluid motor. The bellows 212 have a spring factor which normally biases the carriers 206 toward each other and in the absence of a pressurized fluid supplied within expansible chambers 214, the carriers 206 would normally abut each other as shown in FIG. 12. The presence of a pressurized fluid in chambers 214 acts against the spring force of the bellows 212 and the hydrostatic bearing formed between the surface 210 and the adjacent magnetizable surface layer 27, which constitute the resisting and balancing means to achieve equilibrium in the system in a similar manner to that previously described.

Figure 14:
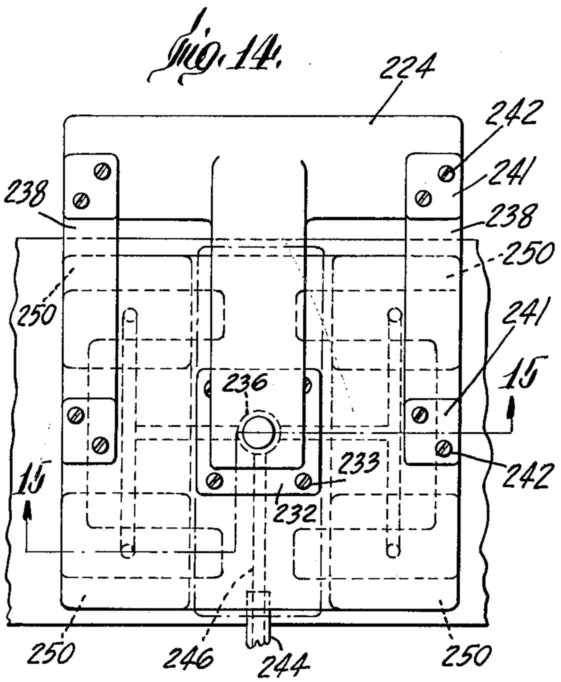
FIG. 14 is a plan view of the apparatus shown in FIG. 13.
Figure 13:
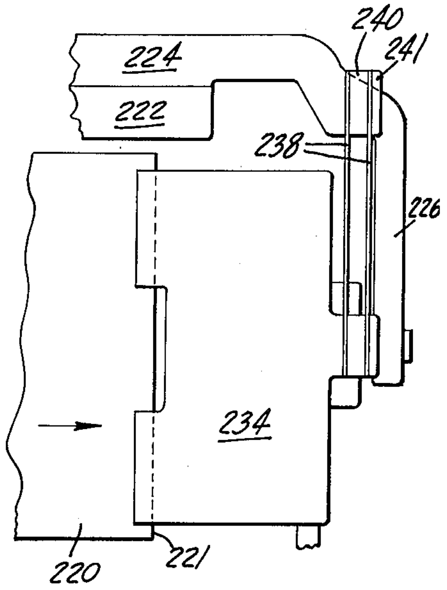
FIG. 13 is an elevation view illustrating an apparatus for applying the principles of this invention to a drum-type magnetic data storage device.
Figure 15:
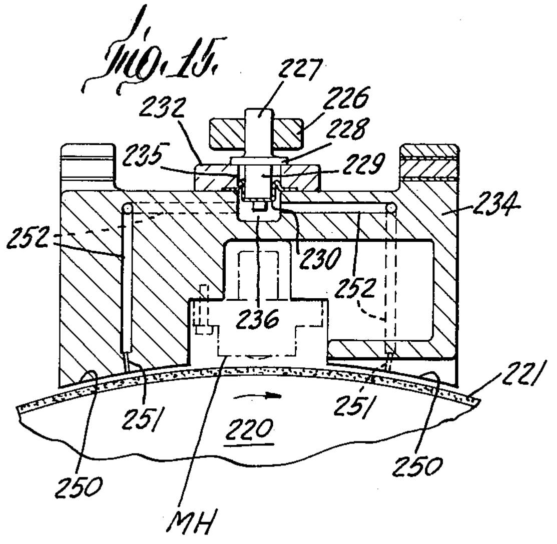
FIG. 15 is a sectional view taken along line 15—15 of FIG. 14.

The present invention may also be adapted to a magnetic data storage device of the rotatable drum type. The problems caused by the dynamic and thermal factors of the drum are in general similar to that encountered with a rotatable disc-type device and the adaptation of the invention is analogous in function although certain structural modifications must be made to accommodate the requirements peculiar to a rotatable drum. A preferred embodiment of the adaptation of this invention to a drum-type magnetic data storage device is shown in FIGS. 13, 14, and 15. A magnetic drum 220 is supported on a suitable bed (not shown) and has a magnetizable surface layer 221. A base 222 attached to the bed contains journals to adapt the drum for rotation by a suitable means (not shown). A frame 224 is radially adjustable and secured to base 222 by suitable means. A support arm 226 extends from frame 224 and this support arm is spaced from the drum perimeter. Support arm 226 has a bore for holding a stud 227 which includes an enlarged flange or portion 228 and a piston portion 229. A "Belloframe" type diaphragm 230 is secured to the piston portion 229 and to a cover plate 232, which cover plate is attached to a carrier body 234 by suitable screws 233. The cover plate 232 includes a cylindrical bore 235 which is in register with a cavity 236 in carrier body 234. The carrier 234 is supported from the frame 224 by means of two pairs of reeds 238 which are secured by spacer blocks 240, cover plates 241, and screws 242 in a manner similar to that previously described. The cavity 236 forms the movable cylinder portion of a fluid motor similar to that described for the previous embodiments and the diaphragm 230 forms one wall of the movable cylinder.

A fluid pressure supply line 244, FIG. 14, is in fluid communication with a conduit 246 leading to cavity 236 and the fluid motor. Bearing or pad surfaces 250 are provided on the side of the carrier 234 adjacent the magnetizable surface layer 221 and a restricted passage 251 is provided in each surface 250. The passage 251 is connected with the cavity 236 by suitable conduits 252. A multiple transducer head assembly MH, indicated in phantom lines in FIG. 15, is rigidly secured to the carrier 234 for movement therewith. It is believed the operation of the device will be evident as it operates similar to that previously described wherein the fluid motor tends to force the carrier 234 toward the magnetizable surface layer and this force is opposed by the reactive force of the hydrostatic bearing caused by fluid exiting from orifices 251 and the biasing force of reeds 238 which normally bias the carrier 234 away from the surface layer 221.

It may further be evident that a plurality of the assemblies described in connection with FIGS. 13 through 15 may be mounted around the drum as required.

Having disclosed and illustrated several embodiments of the present invention in particular environments and adaptations, the principles involved are susceptible to numerous other modifications which will be apparent to those persons skilled in the art and the invention is, therefore, to be limited only as indicated by the scope of the appended claims, including reasonable equivalents thereof.

We claim:

1. A magnetic data storage device having at least two bodies rotatable in unison and each provided with a magnetizable surface layer, said bodies being spaced a fixed distance from each other in parallel relationship, a plurality of magnetic transducer heads positioned transversely to the direction of rotation of the bodies, these heads having flux path forming poles terminating in one extremity thereof and being spaced from the surface layer of each body to form an air gap therebetween, and improved means to consistently and automatically maintain this air gap at a predetermined magnitude, said means comprising: a frame member interposed centrally in the space between the bodies in fixed relationship to the rotative axis thereof, the frame member extending over the surface layer in a direction substantially transverse to the direction of rotation of the bodies; a pair of carriers mounting the magnetic heads, the carriers being of substantially the same extension as the frame; independent yieldable spring means attached adjacent the ends of the frames and carriers respectively for supporting the carriers in juxtaposition parallel to the frame, said spring means permitting a limited movement of the carriers in a direction substantially parallel to an imaginary line normal to the magnetizable surface layer only; a pad surface being integral with the carriers in the proximity of the spring means, the pad surface facing the adjacent magnetizable surface layer in parallel relationship thereto; an expansible chamber fluid power motor with its cylinder portion formed behind the pad of one of the carriers and its piston portion depending from behind the pad of the other carrier, said expansible chamber provided with a fluid power supply inlet and being in fluid communication with a restricted outlet terminating centrally of the pad surfaces, and means for securing a plurality of magnetic heads to each carrier with the flux path forming poles of the heads located in a single plane parallel to the surfaces of said pads.

2. A device as defined in claim 1 wherein said expansible chamber forms an element of a hydrostatic bearing means, which means includes said pads and said magnetizable surface layers adjacent thereto, which together form leakage paths for the fluid escaping through the restricted outlets in communication with the expansible chamber, said bearing means and spring means being proportioned to balance the force of the fluid power motor in a manner to establish a predetermined separation between the pads and the adjacent surface layers.

3. A device as defined in claim 2 wherein said spring means are biased to urge the carriers toward the central position between the opposing surface layers of the bodies, and wherein the force supplied by the expansible chamber fluid power motor provides a means to override said spring bias, thereby tending to move the carriers away from the central fluid position toward the opposing surface layers to a predetermined position therefrom.

References Cited in the file of this patent

UNITED STATES PATENTS

| | | |
|---|---|---|
| 2,787,750 | Jones | Apr. 2, 1957 |
| 2,957,051 | Epstein | Oct. 18, 1960 |

FOREIGN PATENTS

| | | |
|---|---|---|
| 764,433 | Great Britain | Dec. 28, 1956 |
| 764,434 | Great Britain | Dec. 28, 1956 |
| 1,020,803 | Germany | Dec. 12, 1957 |